Nov. 9, 1943.   F. S. TAYLOR   2,333,828
SPRING JAW TRAP
Filed Feb. 27, 1942   3 Sheets-Sheet 1

F. S. Taylor INVENTOR.

Nov. 9, 1943.    F. S. TAYLOR    2,333,828
SPRING JAW TRAP
Filed Feb. 27, 1942    3 Sheets-Sheet 2
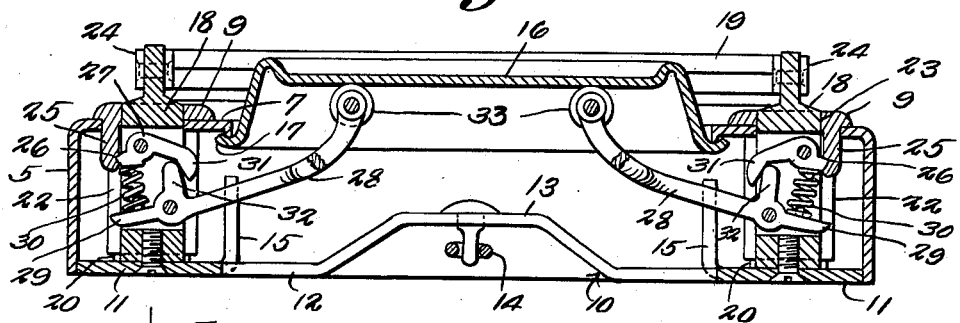
Fig. 3.
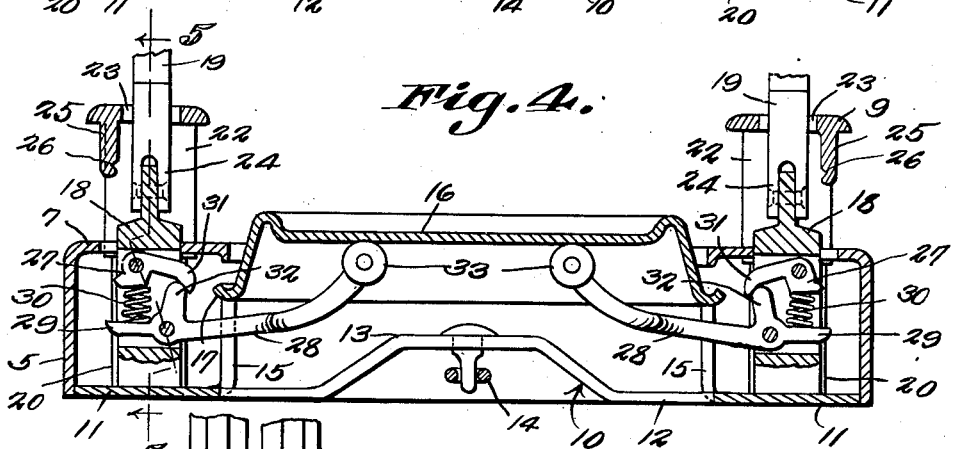
Fig. 4.
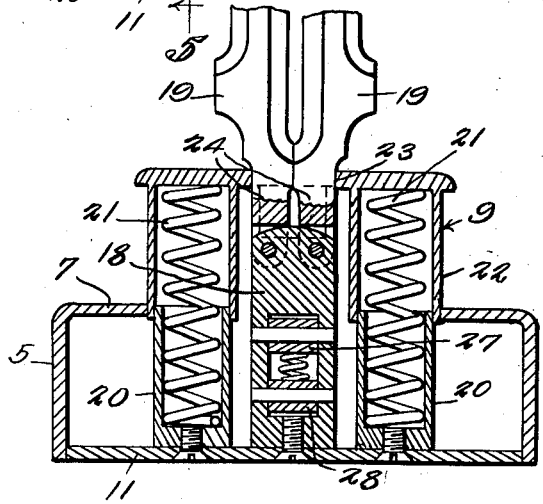
Fig. 5.
Fig. 6.
F. S. Taylor
INVENTOR.
BY Nov. 9, 1943.　　　F. S. TAYLOR　　　2,333,828
SPRING JAW TRAP
Filed Feb. 27, 1942　　　3 Sheets-Sheet 3
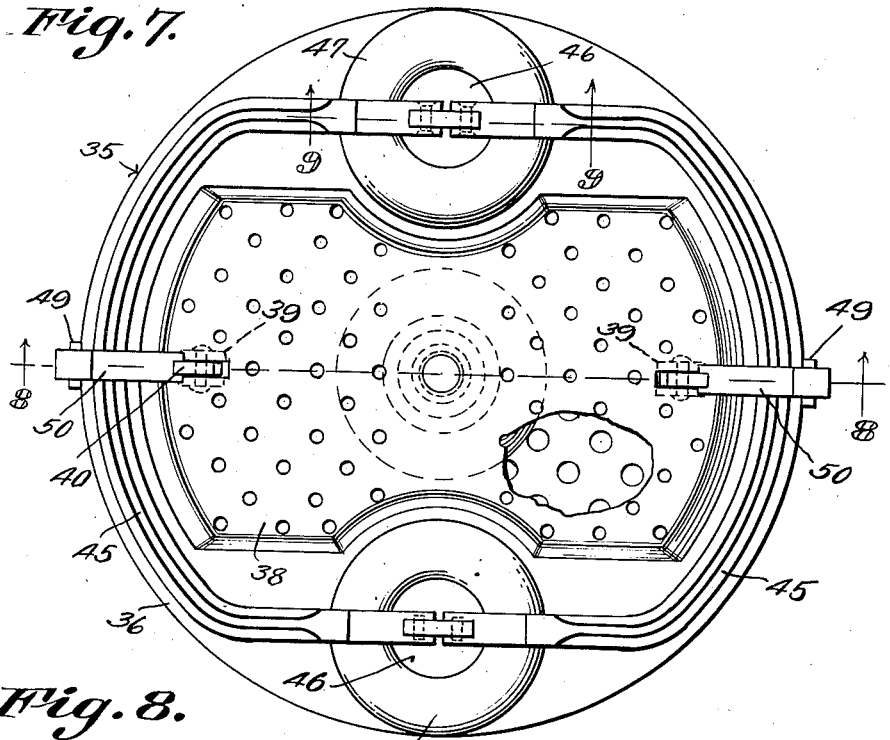
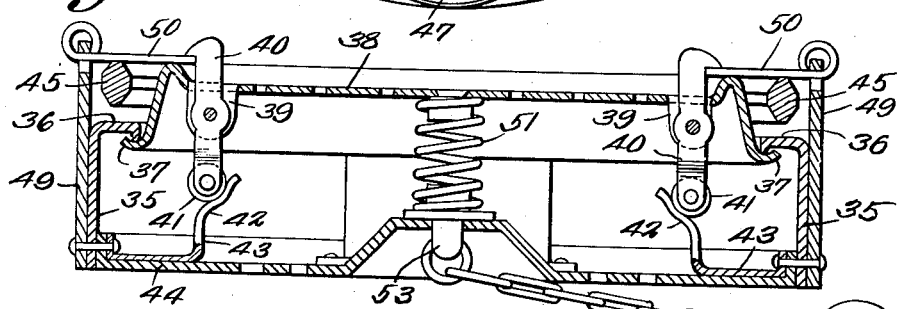
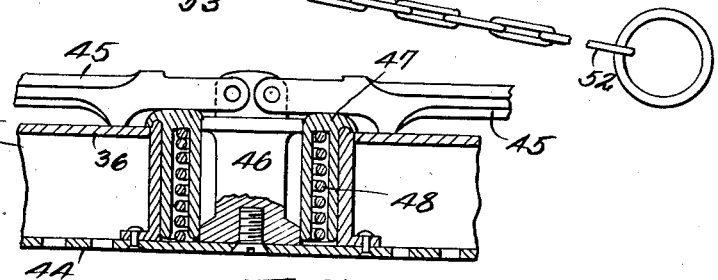
F. S. Taylor INVENTOR.

Patented Nov. 9, 1943

2,333,828

UNITED STATES PATENT OFFICE 2,333,828

SPRING JAW TRAP

Frank S. Taylor, Content, Mont.

Application February 27, 1942, Serial No. 432,688

4 Claims. (Cl. 43—88)

This invention relates to traps, and more particularly to traps of the pivoted spring jaw type.

An important object of the invention is to provide a trap including a body portion in the form of a housing in which the trigger mechanism is mounted, to the end that foreign matter which would otherwise prevent or retard the operation of the trap, will be excluded from the working parts of the trap.

A further object of the invention is to provide a trap which may be concealed to a better advantage, than traps now in common use, eliminating the use of covering paper or canvas for concealing purposes, and at the same time eliminating the danger of the soil or brush used in concealing the trap, obstructing the movements of the jaws thereof.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 3 is a sectional view taken on the line 3—3 of Figure 1.

Figure 4 is a transverse sectional view through the trap illustrating the latches and jaws, after the trap has been sprung.

Figure 5 is a sectional view taken on line 5—5 of Figure 4.

Figure 6 is a perspective view illustrating the vertically movable jaw-operating means.

Figure 7 is a plan view of a modified form of the invention.

Figure 8 is a sectional view taken on line 8—8 of Figure 7.

Figure 9 is a sectional view taken on line 9—9 of Figure 7.

Figure 1:
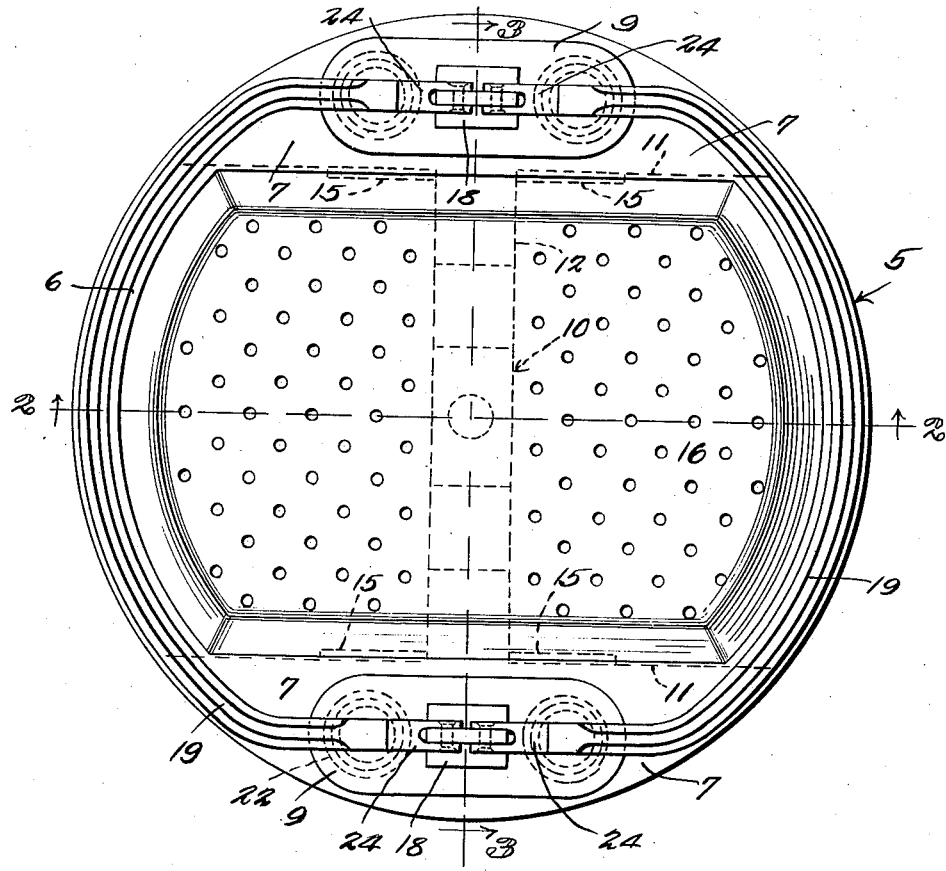
Figure 1 is a plan view of a trap constructed in accordance with the invention, illustrating the trap in its set position.
Figure 2:
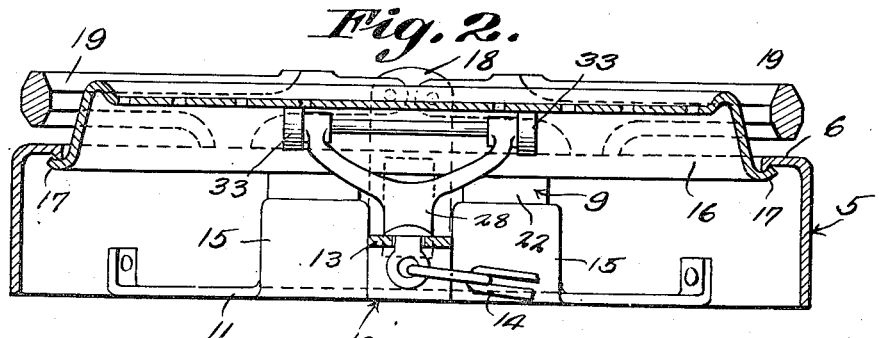
Figure 2 is a sectional view taken on the line 2—2 of Figure 1.

Referring to the drawings in detail, the trap comprises a body 5 which is hollow, and preferably circular in formation. The upper edge of the body 5 is extended inwardly as at 6 providing a circular flange. The bottom of the body 5 is open, so that easy access to the latches and working parts of the trap may be had.

The flange 6 is constructed to provide substantially wide portions 7, which are formed with openings to accommodate the jaw supports 18 and vertically movable jaw-actuating members 9.

Secured within the bottom of the housing or body 5, is a support 10 which embodies wide end members 11 connected by a central bar 12, the bar 12 being formed with an upwardly disposed offset portion 13 to which the anchor chain 14 of the trap is riveted. Upstanding fingers 15 form a part of the support 10, and extend to points in spaced relation with the flange 6, providing stops for the vertically movable pan 16.

This pan 16 is of a diameter slightly greater than the diameter of the opening in the top of the body 5, as shown by Figures 3 and 4 of the drawings, and is so constructed that the upturned edge 17 of the pan will engage the free edge of the flange 6, restricting movement of the pan 16, in one direction. Arising from the support 10, are the posts 18 to which the jaws 19 are pivotally connected. On opposite sides of the posts 18, are open-ended cylinders 20 in which the coiled springs 21 are mounted, the coiled springs 21 having their upper ends disposed within the tubular members 22 of the vertically movable jaw-actuating members 9, the lower ends of the tubular members 22 being open to receive the coiled springs in such a way that the members 20 and 22 may telescope. These vertically movable jaw-actuating members 9 are formed with central openings 23, which openings are of sizes to accommodate the shanks 24 or pivoted ends of the jaws. A keeper bar indicated at 25 also forms a part of each of the vertically movable jaw-actuating members 9, the keeper bars 25 having notches 26 in their inner faces, for the reception of the latches 27 that are pivotally mounted within openings of the posts 18.

Associated with each latch member 27, is a latch-actuating bar 28, which bars are also pivotally mounted within openings of the posts 18, directly below the latch members 27, the latch-actuating bars 28 being provided with extensions 29 that provide seats for the coiled springs 30. These coiled springs 30, being positioned between the extensions 29 and latch members 27, normally act to urge the latch members into engagement with the notches 26, holding the vertically movable jaw-actuating members in their set positions.

The latch members are also formed with fingers 31 that are engaged by the fingers 32 arising from the latch-actuating bars 28. Rollers indicated at 33 are mounted on the inner forked ends of the latch-actuating bars 28, and engage the bottom surface of the pan 16, to the end that under normal conditions, the action of the springs 30 will be to urge the pan 16 upwardly, to the position shown by Figure 3 of the drawings. Upon downward movement of the pan 16, the latch-actuating bars 28 will be depressed, causing the fingers 32 thereof to move over the fingers 31 of the latch members, moving the latch members to positions to disengage the vertically movable jaw-actuating members 9, releasing the members 9, which in turn move over the jaws, closing them.

It will of course be obvious that as the pan 16 moves downwardly under the weight of an animal stepping thereon, the pan will engage the upstanding fingers 15 of the support, restricting downward movement of the pan beyond a predetermined point. In the form of the invention as illustrated by sheet 3 of the drawings, the housing or body portion is indicated by the reference character 35 and, like the invention as illustrated by Figure 1 of the drawings, the body portion is formed with an inwardly extended flange 36 that engages the upturned edge 37 of the pan 38. In this form of the invention, ears 39 are formed on the pan and extend into the housing, the ears providing supports for the pivoted latches 40 that have their upper ends extended above the upper surface of the pan, while the lower ends thereof extend into the housing.

On the lower ends of the pivoted latches 40, are rollers 41 that are adapted to move over the inclined ends 42 of the arms 43 that are secured to the support 44.

The pivoted jaws, which are indicated by the reference character 45 are mounted at the upper ends of the posts 46 that are secured to the support 44 directly opposite to each other. These posts 46 are slightly longer than the sides of the housing or body 35, so that ample clearance is provided for the pivoted jaws 45. Fitted over the posts 46, are jaw-actuating tubes 47 that house coiled springs 48, the coiled springs 48 being adapted to normally urge the jaw-actuating tubes 47 upwardly against the pivoted jaws 45 that engage the upper ends of the tubes 47.

Secured to the housing or body portion 35, and extending above the upper surface of the housing 35, are bars 49 which are formed with openings adjacent to the upper ends thereof in which the pivoted arms 50 are mounted. These pivoted arms 50 are of lengths to extend over the edge of the pan 38, as clearly shown by Figure 8 of the drawings, where they are engaged by the upper ends of the pivoted latches 40. These arms 50 and latches 40 hold the pan 38 in its set position, against the action of the coiled spring 51, which is mounted between the support 44 and center of the pan 38.

When the pan 38 is depressed, by an animal stepping thereon, it is obvious that as the pan moves downwardly, the lower end of the pivoted latch 40, moving over the inclined ends 42 of the arms 43, will cause the latches 40 to move to disengage the pivoted arms 50, releasing the jaws, which swing together in gripping relation with respect to each other, under the action of the coiled springs 48 and jaw-actuating tubes 47 moved by the springs.

The anchor chain in this form of the invention is indicated by the reference character 52 and is connected with the trap through the eye 53 secured to the support.

In view of the foregoing detailed description, it is believed that a further description as to the operation of the trap is unnecessary.

What is claimed is:

1. In a trap, a housing having an open top, a vertically movable member adapted to close the top of the housing, a pair of pivoted jaws mounted on the housing, tubular jaw-actuating members extended into the housing and adapted to move the jaws to their gripping positions, spring pressed latch members entirely encased within the housing and adapted to normally hold said jaw-actuating members in their set positions, and means controlled by the action of the vertically movable member adapted to operate the latch members, releasing the jaw-actuating members, whereby the jaws are moved to their gripping positions with respect to each other.

2. In a trap, a housing having an open top and bottom, an inwardly extended continuous flange on the top of the housing, a vertically movable member adapted to engage said flange completely closing the top of the housing, pairs of vertically swinging jaws mounted on the housing, tubular jaw-engaging members forming a part of the trap and adapted to hold the jaws in a set position, latch members entirely enclosed within the housing adapted to hold the tubular members in their set positions, means actuated by the vertically movable member for releasing the latch members, and springs disposed within the tubular jaw engaging members adapted to move the tubular jaw engaging members upwardly, whereby said jaws are moved into gripping relation with respect to each other.

3. In a trap, a housing having an open top, a vertically movable disk-like cover operating within the housing and adapted to move to a position to close the top of the housing, a pair of jaws pivotally connected with the housing and adapted to swing to their gripping positions above the housing, means for normally holding the jaws in their set positions, said means including vertically movable telescoping members mounted within the housing, said telescoping members having notches, pivoted latch members completely encased within the housing and adapted to engage within the notches, normally holding the latch members in their set positions, and said latch members adapted to be operated by downward pressure on the cover, releasing the latch members and jaws.

4. In a trap, a housing having an open top, a vertically movable disk-like member adapted to close the opening in the top of the housing, vertical posts extending upwardly from the bottom of the housing, the upper ends of said posts being disposed above the top of the housing, jaws pivotally connected with the posts at the upper ends of the posts, tubular members extending into the housing, springs mounted within the tubular members and adapted to urge the tubular members over the jaws, closing the jaws, latch actuating bars pivotally mounted in openings of the posts, the inner ends of said bars adapted to rest against the disk-like member, latch members mounted on the posts and adapted to engage the tubular members, holding the tubular members in their set positions, and fingers on the latch actuating bars adapted to engage the latch members to operate the latch members and thereby release the tubular members when the disk-like member is depressed.

FRANK S. TAYLOR.